April 28, 1959 G. W. HAAB 2,883,814
CASING MACHINE
Filed June 11, 1958 6 Sheets-Sheet 1

INVENTOR
Gordon W. Haab
BY
Mason, Fenwick, & Lawrence
ATTORNEY

April 28, 1959

G. W. HAAB 2,883,814

CASING MACHINE

Filed June 11, 1958

INVENTOR
Gordon W. Haab

BY Mason, Fenwick & Lawrence
ATTORNEYS

April 28, 1959  G. W. HAAB  2,883,814
CASING MACHINE
Filed June 11, 1958  6 Sheets-Sheet 4

INVENTOR
Gordon W. Haab

BY Mason, Fenwick & Lawrence
ATTORNEYS

April 28, 1959   G. W. HAAB   2,883,814
CASING MACHINE
Filed June 11, 1958   6 Sheets-Sheet 5

INVENTOR
Gordon W. Haab

BY Mason, Fenwick & Lawrence
ATTORNEYS

April 28, 1959     G. W. HAAB     2,883,814
CASING MACHINE Filed June 11, 1958                                   6 Sheets-Sheet 6

INVENTOR
Gordon W. Haab
BY Mason, Fenwick & Lawrence
ATTORNEYS

United States Patent Office 2,883,814
Patented Apr. 28, 1959

2,883,814

CASING MACHINE

Gordon W. Haab, Richmond, Va.

Application June 11, 1958, Serial No. 741,288

10 Claims. (Cl. 53—201)

This invention relates to casing machines of the type which will automatically case articles, containers, cartons and the like, and eject the filled cases, and relates particularly to improvements in casing machines as disclosed in my co-pending application Serial No. 581,574, filed April 30, 1956.

The machine of the prior disclosure is particularly adapted to the casing of paper milk cartons, and includes means for supplying cartons in single line arrangement in front of an accumulating chamber, and horizontal transfer means to move rows of predetermined numbers of cartons from the supply means into the chamber to assemble case lots. The individual containers of assembled case lots are gripped, and the lot lowered into a case previously delivered and positioned below the chamber, and the case ejected. Most of the movements of the machine are initiated by movement of the articles through the machine, and vacuum is used as the motivating power.

The present invention has for its general object the provision of a machine of this nature which is designed to be more adaptable to different uses and different installations than the machine disclosed in the above-mentioned application.

A more specific object is to provide such a machine wherein the several mechanisms of the machine are constructed as units and are capable of assembly in more than one arrangement, so that the machine may be erected to suit space or machinery arrangement requirements of different users.

Another object is to provide a machine of this nature which may be assembled for right or left hand operation, with all of the parts properly cooperating with one another in either arrangement.

A further object is the provision of a machine such as is disclosed in the prior application, having means to vary the capacity of the accumulating chamber and thus adapt the machine to use with various products and cases of different sizes.

Other objects of the invention will become apparent from the following description of one practical embodiment thereof, when taken in conjunction with the drawings which accompany, and form part of, this application.

In general, the invention comprises a casing machine composed of a control unit, a supply feed unit, which includes case ejector mechanism, and a transfer unit, with the several units designed to be attached to one another in different arrangements in accordance with requirements. Controls, vacuum lines, and electric lines are arranged on a control table in such manner that the arrangement may be reversed in accordance with the arrangement of the basic units of the machine. Means are provided also for adjusting the machine to change the capacity or to adapt it for use with different articles.

Referring to the drawings in detail, there is shown a casing machine 1 of the type disclosed in my prior application Serial No. 581,574, composed of a control unit 2, a supply feed unit 3 and a transfer unit 4. These are the several units which can be variously assembled and adjusted as mentioned above. The control unit 2 is the base portion of the machine, and the several other units are connected to it, or mounted upon it.

Before describing in detail the particular construction of the three units of the machine which permits the accomplishment of the objects set out above, a description of the general operation of the machine will be given so that the structural elements may be properly oriented. A detailed description of any of the elements not described herein can be had from the above mentioned prior application.

Milk cartons are fed to the machine on a conveyor 5. The cartons are carried by the conveyor to a dead-plate 6, composed in the present embodiment of a plurality of rollers 7. As the cartons reach the dead plate, the space between them is closed and cartons being fed by the conveyor push those on the dead plate across the plate until they reach the far end. At this time, a predetermined number of cartons will be upon the plate, which number will form a row when the cartons are cased. As the lead carton reaches the far end of the dead plate, it will be pressed against, and close, a micro switch 8, which will close a circuit to a solenoid 9 which operates a control valve 10 to connect a horizontal transfer cylinder 11 to a source of vacuum supply. This will cause the piston within the transfer cylinder to move forwardly, and a transfer plate 12 will contact the accumulated row of cartons on the dead plate and push the row from the plate into the accumulating chamber. As the cartons move forward the micro switch 8 is released, breaking the circuit to the solenoid 9. As the transfer plate moves forward it carries a retaining gate 13 across the supply path, preventing additional cartons from moving onto the dead plate. When the transfer plate approaches its limit of travel, a micro trip 14, which is carried by the plate, strikes and actuates a micro switch 14' which energizes a solenoid 15 to reverse the position of the control valve 10 to retract the transfer plate. After the transfer plate reaches its fully retracted position, cartons can again move upon the dead plate as before. This cycle is repeated a predetermined number of times until the desired number of rows of cartons have been moved into the accumulating chamber.

Each row of cartons as it moves into the accumulating chamber pushes the previous row ahead of it across an accumulating table 16 which forms the bottom of an accumulating chamber 17 within the transfer unit 4. When the first row of cartons reaches the back of the accumulating table, the cartons strike micro switches 18, 19 and 20, which will energize solenoid 21 to reverse the position of control valve 22 to connect the bottom of the vertical transfer cylinder assembly 23 to the source of vacuum and the top of the cylinder to exhaust to atmosphere. This will start downward movement of the vertical transfer head 24. The vertical transfer mechanism will move downwardly until the vacuum cups 25 on the head contact the tops of the cartons in the accumulating chamber. This will cause the actuation of a switch to energize the solenoid 26 which actuates a valve to couple the vacuum cups to a source of vacuum, so that the cartons will be gripped. When the cartons are gripped, circuits are closed to energize a solenoid 27 which controls a valve 28 to couple a cylinder piston assembly 29 to a source of vacuum, which assembly has its piston connected to the accumulating table 16. The action as just described puts the cylinder 29 in condition to retract the table but it will not move due to the friction created by the milk cartons resting upon it. At the same time, a solenoid 30 is actuated which reverses the position of control valve 22 and couples the top of the vertical transfer cylinder 23 to the source of vacuum. This lifts the transfer head with the attached cartons. The accumulating table is instantly withdrawn by its cylinder 29 and, due to the operation of certain switches, control valve 22 is again reversed and the transfer head moves downwardly carrying the cartons through the bottom of the accumulating chamber and into a case positioned below the accumulating chamber on a case track 31.

When the transfer head reaches its lowermost position, certain switches will be actuated which will release the cartons and cause the valve 22 to again be reversed to raise the transfer head to its inoperative position. When the head passes through the open bottom of the accumulating chamber a solenoid 32 will be actuated to reverse the valve 28, and the accumulating table may move back into its carton-supporting position.

At the same time that these operations are taking place, a case ejector cylinder assembly 33 is operated by means of a control valve 34 which in turn is controlled by a cut-off valve 35. Valve 34 is moved in opposite directions by solenoids 36 and 37, and the cut-off valve 35 is similarly moved by solenoids 38 and 39.

The details of the structural elements, the arrangement of the various switches and control circuits which bring about the movement of the various parts, are all described in detail in the above mentioned application. The present disclosure is concerned with the specific structure of the three basic elements 2, 3 and 4 and the arrangement of the control and operating elements on the control unit 2 to give the machine the versatility previously mentioned.

Referring now to the particular structure pertinent to the present invention, the control unit is built upon a frame which includes a pair of end members having front legs 40 and back legs 41. The back legs 41 are shorter than the front legs, so that the tops of the end members may be stepped at the rear edge of the unit. The top members interconnecting the legs have horizontal sections 42 connected to the front legs and extending rearwardly, horizontal sections 43 connected to the tops of the shorter rear legs and projecting forwardly, and the vertical members 44 interconnecting the rear ends of the sections 42 and the front ends of the sections 43. Thus, a recessed seat 45 at the rear is formed to receive the supply feed unit. The end members may be connected together by any desired number of horizontal connectors 46.

One or more platforms 47 may be supported on the horizontal connectors 46 to mount a motor 48, gear box 49, etc. Across the tops of the end member sections 42 a control table 50 is positioned and many of the control elements of the machine are mounted on it. A suitable cover 51 surrounds the frame to enclose the unit, and a hood 52 forms a housing about the controls and control table.

In order to provide for reversible mounting of the controls, all of the major elements on the control table are mounted symmetrically about the center line of the table. The horizontal transfer cylinder 11 is mounted on top of the table and the accumulating table retracting cylinder 29 is mounted beneath the control table, both having their longitudinal axes in a vertical plane including the transverse center line of the control table.

Figure 5:
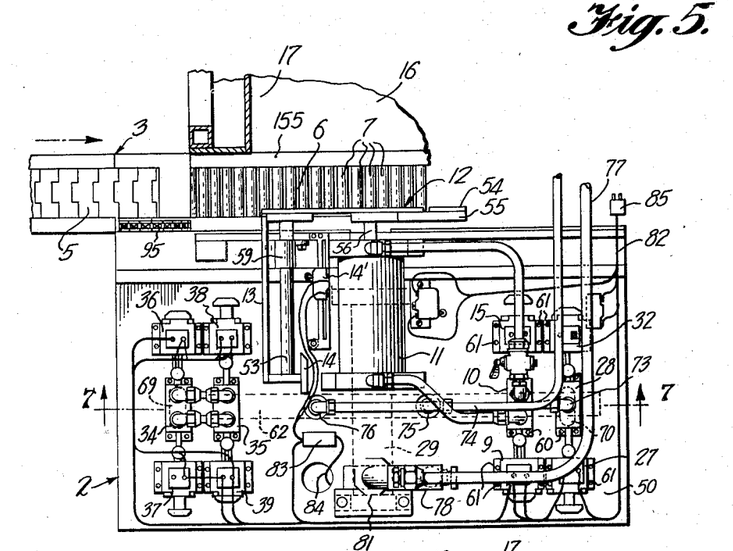
Figure 5 is a top plan view of the control unit with the cover housing removed, showing the controls, vacuum lines and electric lines arranged for left hand supply feed.
Figure 6:
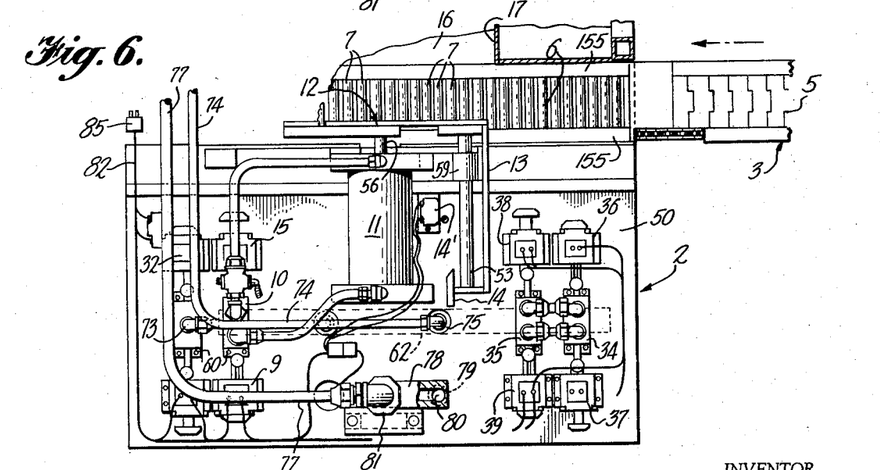
Figure 6 is a view similar to Figure 5, with the controls, vacuum lines and electric lines reversed for right hand supply feed.
Figure 7:
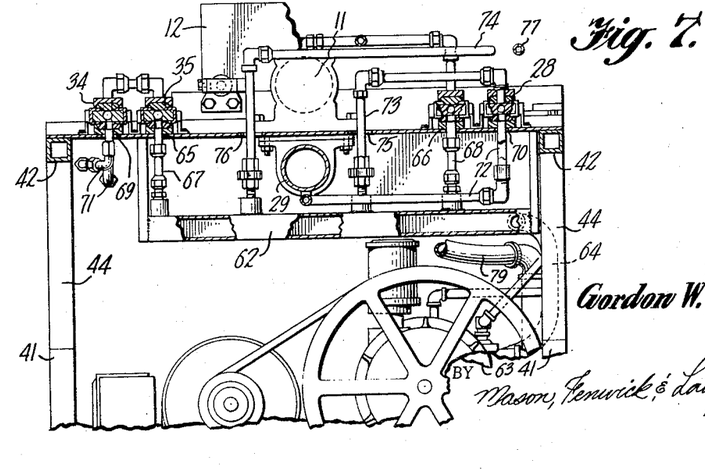
Figure 7 is a vertical section through the control unit, and is taken on the line 7—7 of Figure 5.

The transfer plate 12 and its guide arm 53 can be mounted either to the right or left of the transfer cylinder, as shown in Figures 5 and 6. The transfer plate may have an extension 54 connectable to the main plate by bars 55 to adapt the plate to moving carton rows of different length.

Figure 8:
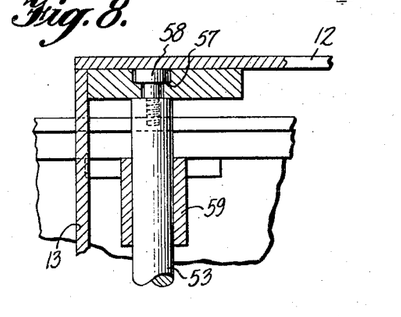
Figure 8 is a detail showing of the manner of connecting the horizontal transfer plate to its guide rod.
Figure 9:
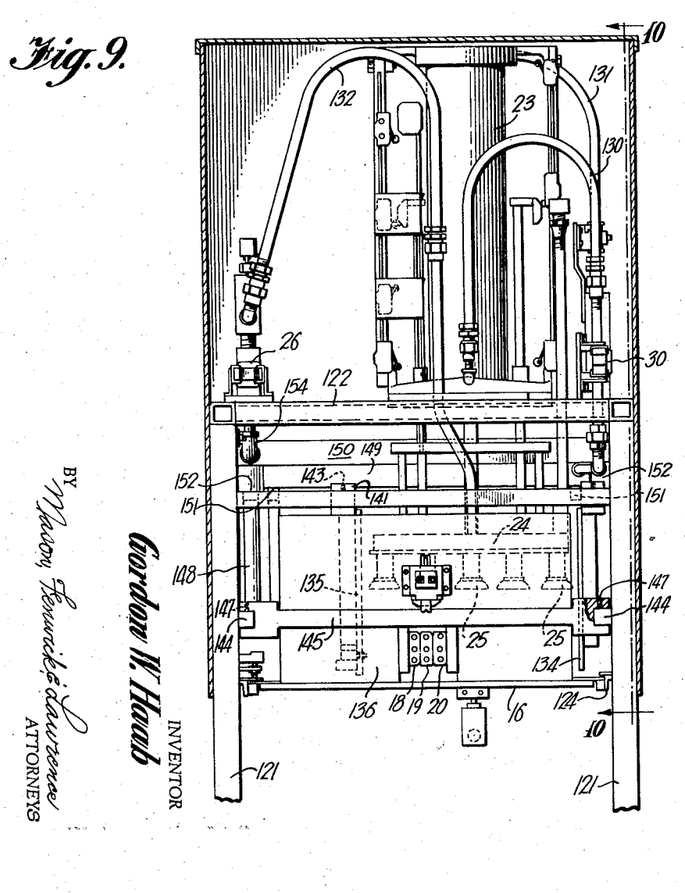
Figure 9 is a vertical section through the transfer unit housing, showing the vertical transfer mechanism in rear elevation.
Figure 10:
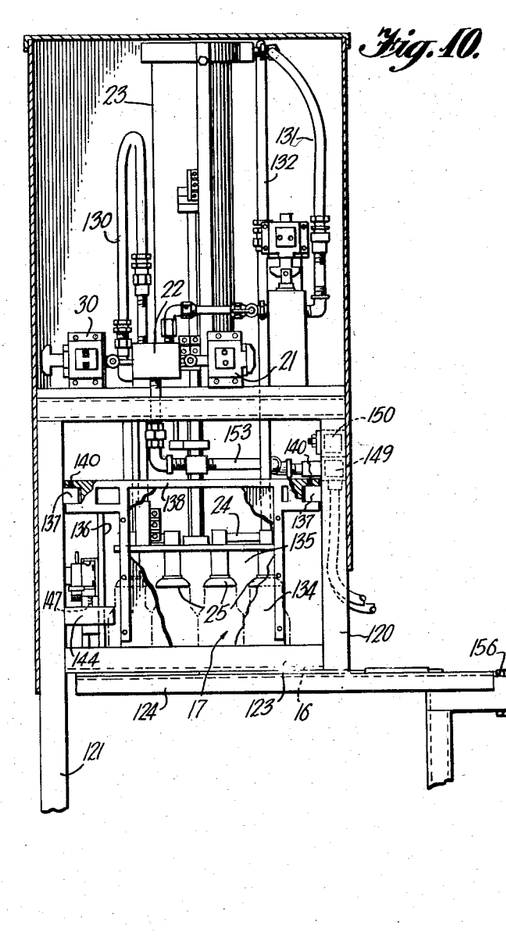
Figure 10 is another vertical section through the transfer unit housing, taken at right angles to Figure 9 and on the line 10—10 of Figure 9.
Figure 11:
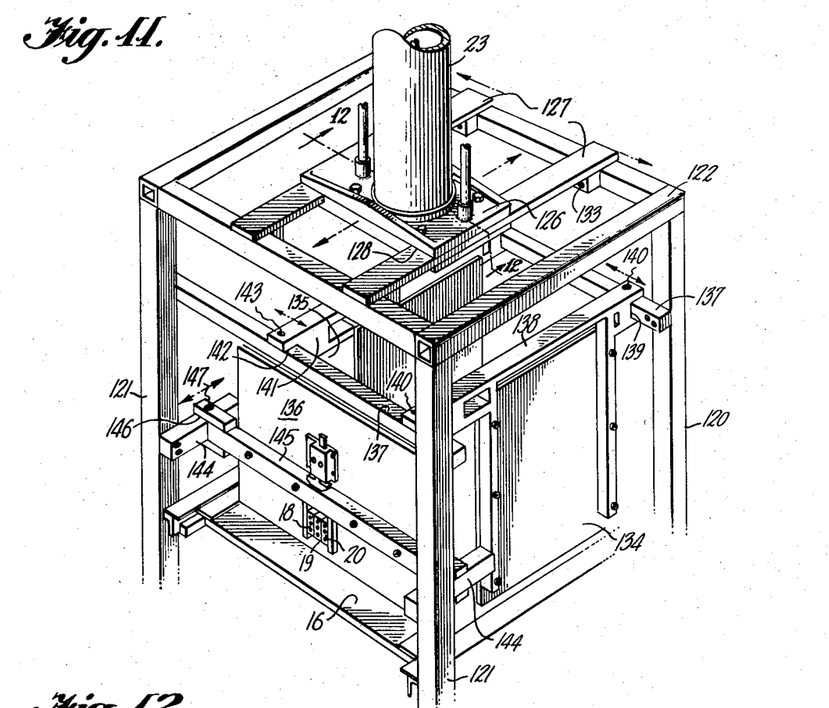
Figure 11 is a perspective view of a portion of the vertical transfer mechanism and the accumulating chamber, illustrating the adjustable features of the transfer unit.
Figure 12:
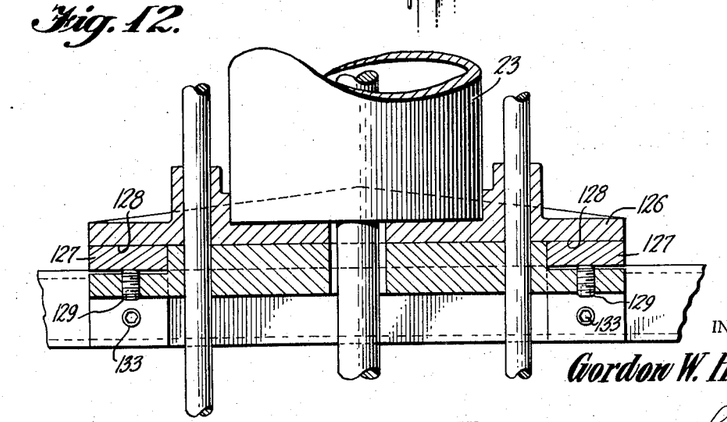
Figure 12 is a vertical section through the vertical transfer cylinder and its adjustable mounting.

To enable the transfer plate and guide to be reversed without need for precision machining to provide absolute parallelism between the guide arm, or rod, 53 and the piston rod 56 of the cylinder assembly 11, guide rod 53 is connected to the plate by means of a connection allowing some movement of the plate relative to the rod. This consists of a recessed seat 57 in the connecting member and a headed bolt 58, fitting loosely in the seat 57 and being threaded in the end of the guide rod. When the transfer plate is reversed, the bearing 59 for the guide rod 53 and the micro switch 15 will be attached at the opposite side of the cylinder 11.

The control table will be drilled to provide bolt holes for attachment of the valves 10, 28, 34 and 35 and their actuating solenoids 9, 15, 27, 32, 36, 37, 38 and 39. All of the valves will have similar mounting plates, apertured to coincide with the drilled openings in the control table. Therefore, any of the valves may be mounted in any of the valve positions by means of the bolts 60. The several solenoids are also interchangeable, and they are mounted by bolts 61. It is to be noted that the positioning of the valves and solenoids is symmetrical with respect to the control table center line; two valves and their solenoids being on each side of the table.

Directly beneath the valve positions under table 50, there is a vacuum manifold 62 extending nearly the length of the table. This is connected to vacuum pump 63 by hose 64 and has a number of tapped openings to which pipe lines may be connected. Above each of the tapped openings there is an opening in the control table through which a pipe line can pass. The tapped openings and the openings above them are arranged symmetrically with respect to the table center line. Two of the openings in the tables 65 and 66, are directly below the positions of the inner valves of the valve pairs at opposite sides of the table (valves 35 and 10 in the arrangement in Figure 5). Pipe lines 67 and 68 extend from the manifold up through the openings 65 and 66 to connect to the valves above. Thus, whichever valve is positioned above the opening may be connected to the manifold. The other valves of the two pairs, valves 34 and 28, are positioned over elongated openings 69 and 70 in the table top so that the two pipe lines depending from each may pass through the table top. Valve 34 is connected by the pipe lines 71 to opposite ends of the ejecting cylinder 33, and valve 28 is connected by the lines 72 to the cylinder 29 which retracts the accumulator table 16. It will be evident that these valves may be reversed to the positions shown in Figure 6 and yet have vacuum connection to the same elements by using the same pipe connectors.

This same result is possible with a pipe line 73 which connects to the manifold and to the valve 28, and a line 74 which is connected to the manifold and serves to connect the source of vacuum to the transfer unit, as will be described. These two lines pass through openings 75 and 76 in the control table and may have their positions reversed.

A vacuum line 77 from a different vacuum source extends through the control table and leads to the transfer unit for connection to the suction cups 25 carried by the vertical transfer head 24. The line includes a block 78, fixed to the control table, and having an opening in its underside for coupling with a hose 79, from the vacuum source, through an opening 80 in the control table. Opening 80 is to one side of the centerline of the table, and block 78 serves as a conduit to bring the vacuum supply to the table centerline. A coupling 81 permits attachment of the pipe line to the block at the centerline, and makes it possible to swivel the line to extend either to the right or the left.

The electrical controls on the control table are connected to a source of supply by an electric conduit cable 82 having appropriate leads for connection to the various controls. The conduit is equipped with a plug 83 for connection to a lead in wire 84, and a connector 85 for coupling to the transfer unit line to supply current to that unit. The conduit, of course, can be reversed when the controls are reversed, and maintain proper line connections.

The supply feed unit 3 is constructed in such manner that it will fit into the recessed seat 45 at the rear of the control unit and may be arranged for extension in either direction from the control unit, so that articles to be cased can be fed from either direction.

The unit 3 is rectilinear in form, and is composed of a feed section 86 and a case ejecting section 87, both supported upon a pair of parallel base frame members 88. The frame for the feed section comprises vertical end supports 89, secured to the base members 88, and horizontal top runners 90. These may be interconnected by suitable cross members 91. The top runners 90 may project as far beyond the main frame as it may be desired to extend the feed line. At each end of the top runners, bearings 92 are connected to support the shafts 93 and 94. The shafts carry sprockets 95 and 96 about which carton conveyor chain 5 passes. The inner shaft 93 carries a drive sprocket 97, driven by chain 98 from the gear box 49.

The case ejector section of the unit 3 has a frame comprised of the vertical members 99, rising from the base frame members 88, and the horizontal members 100. These are joined by cross members 101. The ejector frame carries a case stop 102 which serves to position empty cases beneath the accumulating chamber 17. The ejector carriage 103 rides between horizontal guides 104, and is carried on the end of piston rod 105 of the cylinder assembly 33. The cylinder is supported upon an angle iron 106 which transversely bridges the pair of vertical frame members 99 adjacent the feed section and an angle iron 107 which bridges the pair of vertical frame members 89 of the feed section farthest removed from the ejector section. The cylinder is attached to angle iron 106 by bolts 108 through slots 109 in the support to permit lateral adjustment of the cylinder. The back end of the cylinder is attached to the support 107 by bolts 110 which carry adjusting nuts 111, so that horizontal alignment of the cylinder may be effected.

Figure 1:
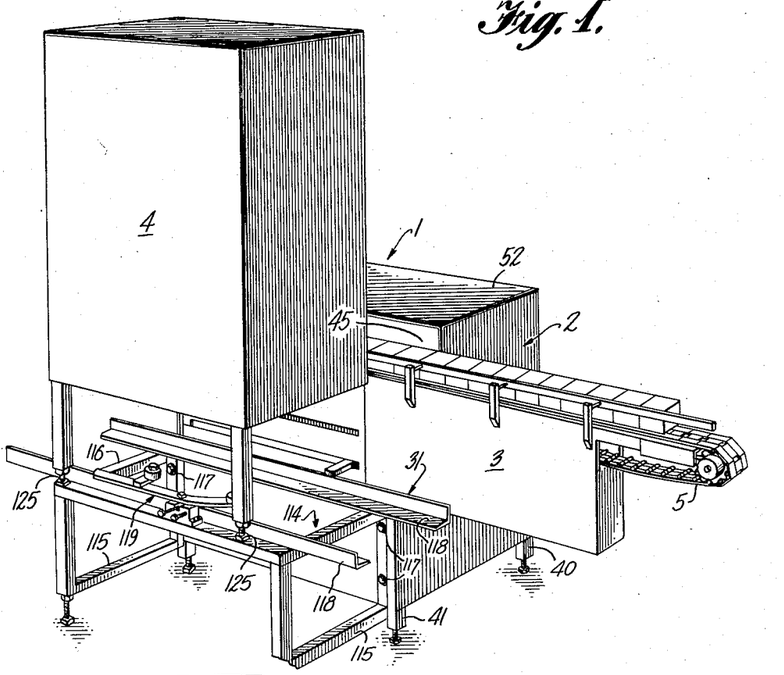
Figure 1 is a perspective view of a casing machine embodying the principles of the present invention.
Figure 2:
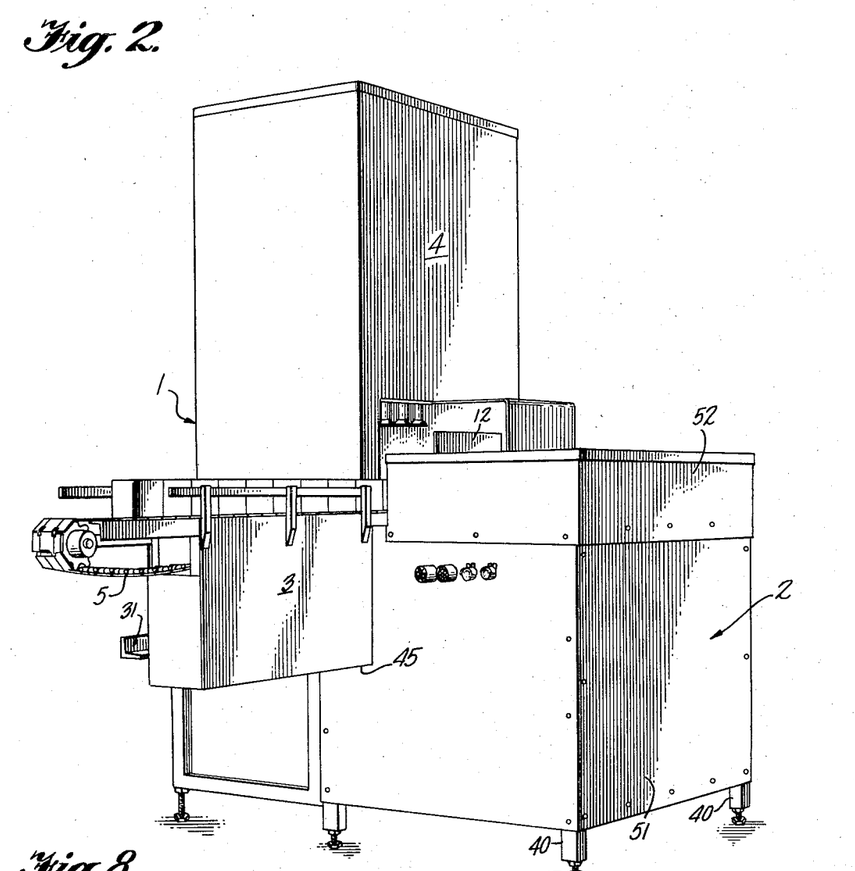
Figure 2 is a perspective view of the machine, viewed from the opposite side.
Figures 3, 4:
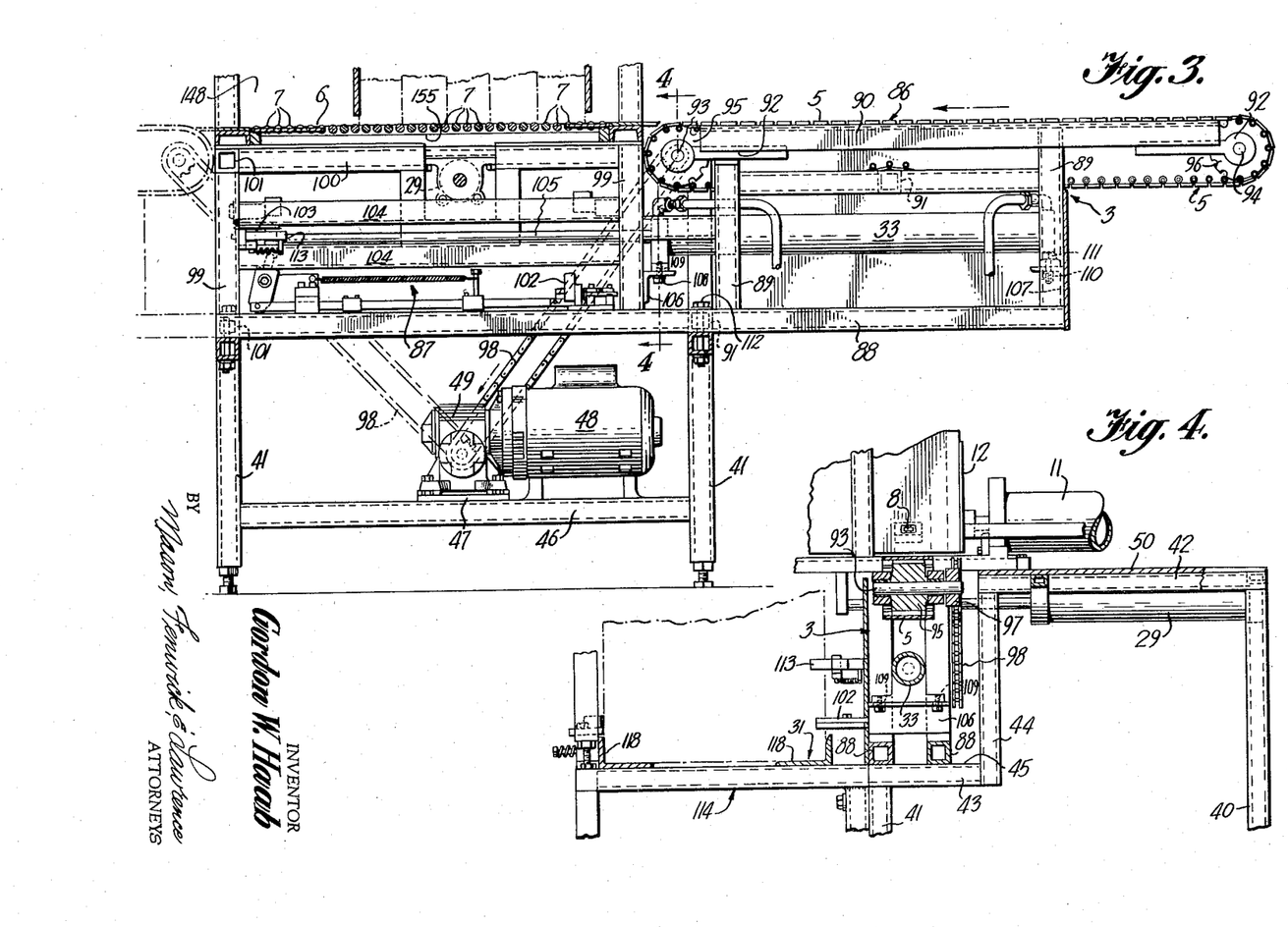
Figure 3 is a vertical section taken longitudinally through the control unit, showing the supply feed unit in side elevation in place on the control unit frame.
Figure 4 is a vertical transverse section through the supply feed unit and associated structure, and is taken on the line 4—4 of Figure 3.

When the supply feed unit is to be assembled with the control unit, it is seated upon the members 43 of the recessed seat 45 at the rear of the control unit. The case ejector section is positioned behind the control unit, with the feed section projecting to one side, either right or left, as shown in Figure 3. Two of the cross members of the frame sections are spaced the same distance apart as the end frames of the control unit frame so that they rest directly upon the members 43. Bolts 112 may be inserted through superposed frame members to lock the sections together. Chain 98 is trained over drive sprocket 97 and the sprocket on the gear box to complete the assembly. Sprocket 97 will be placed upon one end or the other of shaft 93, depending upon the direction in which the feed section projects, to put it in proper alignment with the sprocket on the gear box 49. The case ejecting finger 113, on the carriage 103, and the case stop will be positioned to project beyond the frame in the proper direction for the arrangement of the feed unit with respect to the control unit.

An ejector track frame 114, which consists of end frames 115 and a top frame 116 interconnecting the end frames is bolted to the back of the control unit by bolts 117. Angle members 118 forming the track proper 31 are connected to the top frame. The track frame will carry the case transverse positioning means and succeeding case hold-back mechanism 119, described in detail in the prior application.

The transfer unit is constructed upon a frame which includes front legs 120, long back legs 121 and a rectangular top frame 122. Side members 123 are positioned between the front and rear legs at the bottoms of the short front legs. Arms 124 are connected to the undersides of the side members 123 and project forwardly to rest upon the tops of the front sections 42 of the end frames of the control unit, to support the front of the transfer unit. The rear legs 121 of the frame rest upon the top frame 116 of the track frame 114. Adjustable feet 125 are carried by the lower ends of the back legs 121 to permit leveling of the unit.

The vertical transfer cylinder assembly 23 is carried by a carriage 126, slidably mounted upon rack 127 connected to the front and back rails of the top frame 122. The carriage has grooves 128 at the sides to receive the rails 127, and set screws 129 are employed to lock the carriage in desired positions of adjustment along the rails. This permits complete freedom of forward and rearward adjustment of the cylinder assembly and, of course, the transfer head 24 which it carries and operates. The various vacuum lines to the cylinder and the vacuum cups on the transfer head include the flexible hose sections 130, 131 and 132, to allow for movement of the cylinder along the rails. The rails themselves are held in position on the top frame by set screws 133, and the rails may be moved along the top frame to shift the cylinder assembly laterally.

The accumulating chamber 17 is formed by side wall plates 134 and 135 and a back wall plate 136. All three of these wall plates are adjustable so that the size of the chamber may be changed and the entire chamber can be moved laterally to position it relative to the transfer head. To accomplish this, adjusting rails 137 are secured between the pairs of back legs 121 and the pairs of front legs 120. The side wall plate 134 is suspended from a hanger 138 which is grooved at its side edges, as at 139, to ride along the rails 137. Set screws 140 lock the hanger in place on the rails. Side wall plate 135 is similarly carried by a hanger 141, grooved as at 142, and having set screws 143. This will permit the walls to be moved toward and from one another, and to be moved simultaneously in one direction or the other. Short horizontal rails 144 are carried by the rear legs 121 and project forwardly. On these rails, a hanger bar 145, attached to the back wall plate 136, and grooved as at 146, is adapted to ride. Set screws 147 in the hanger 145 fix it in place along the rails 144. Thus, the back wall of the chamber can be moved forwardly and backwardly.

The above described arrangement will permit the chamber to be varied in size to adapt it to articles of different size, or to different size case lots. It will also permit the entire chamber to be shifted to the right or left to provide a compartment 148 for the entry of the vacuum and electric lines connecting the control and transfer units.

In order to permit attachment of the vacuum lines 74 and 77 to either side of the transfer unit, manifolds 149 and 150 are arranged across the front of the unit above the accumulating chamber. The manifold 149 has connections 151 at either end for coupling the pipe 74. The manifold 150 has connections 152 at each end for coupling the larger pipe line 77. When the pipe lines are connected to one side of the manifolds, the connections at the other side will be plugged. A line 153 leads from the manifold 149 to the appropriate controls for the lines 130 and 131 leading to the vertical transfer cylinder 23, and line 154 leads from manifold 150 to the controls for the line 132 to the transfer head.

The dead plate 6, composed of the plurality of rollers 7 carried by a pair of side rails 155, is mounted on the forwardly projecting arms 124 of the transfer unit. Thus, the dead plate will be properly positioned with respect to the accumulating plate 16 at all times, and with the feed conveyor 5 when all of the units are assembled.

In assembling the transfer unit with the other units, it is put in position with the feet 125 on the legs 121 resting on the back rail of the ejector frame 114 and the forwardly projecting arms 124 resting on the top of the control unit. The feet are adjusted to get the unit in alignment with the other units and the transfer and control units secured together by bolts 156 through the arms 124 and the members 42 of the control unit. The accumulating chamber will be adjusted to one side or the other of the unit, in accordance with the position of the feed unit, and the chamber adjusted to proper size. The cylinder assembly will be adjusted to proper alignment with the accumulating chamber and the vacuum and electric lines connected. The machine is then ready for use.

It will be obvious that the structure of the machine described will be capable of assembly to provide right or left feed, and adjustable to different article sizes and case lots. This is accomplished with but one set of parts, and without need for special adapters or parts to be used when a different assembly is used.

While in the above one embodiment of the invention has been disclosed, it will be understood that the precise details of structure shown and described are for purposes of illustration only and changes may be made within the scope of the appended claims.

What is claimed is:

1. In a casing machine of the type wherein articles to be cased are advanced in single file to form rows, the rows transferred laterally into an accumulating chamber to form case lots, case lots gripped by vertical transfer mechanism, the floor of the accumulating chamber retracted and the case lots lowered by the vertical transfer mechanism into cases positioned on a case track below the accumulating chamber, the improvement which consists in a plurality of independent structural units capable of assembly in different operable arrangements, said units including: a control unit which forms the base for said machine and contains a power source, a source of vacuum supply, vacuum lines capable of connection to other units and controls for the vacuum lines, said control unit having a seat recessed from its upper rear edge; an elongated supply feed unit having one end arranged for resting in reversed positions on the seat of said control unit with the other end projecting beyond said control unit, means for connecting said supply feed and control units, a conveyor on said supply feed unit for feeding articles to be cased in single file toward the end of the supply feed unit positioned on the seat of the control unit, and means for connecting said conveyor to the power source on the control unit; a case track frame connectible to the control unit at the rear thereof below the seat; and, a transfer unit having legs to rest upon the case track frame, forwardly projecting arms to seat upon the control unit, means to connect said transfer unit to the control unit, said transfer unit containing said accumulating chamber and said vertical transfer mechanism.

2. In a casing machine as claimed in claim 1, a control table on said control unit, said table having a plurality of identical groups of control-mounting openings therein, said groups being arranged symmetrically on opposite sides of the centerline of the control table between the table sides, said controls each having openings similar to the groups of openings in the table, whereby the controls may be mounted in various arrangements on said control table.

3. In a casing machine as claimed in claim 2, a vacuum manifold beneath said control table and beneath the positions of the controls on said table, said manifold being connected to said source of vacuum supply, said table having conduit openings centrally of said groups of openings and said manifold having outlet openings in vertical alignment with the conduit openings, whereby the controls may have connection with the manifold in the several positions of arrangement of the controls on the table.

4. In a casing machine as claimed in claim 1 transverse transfer mechanism on said control unit for moving rows of articles into the accumulating chamber, said transverse transfer mechanism including a vacuum cylinder assembly and a transfer plate reversibly mounted on the cylinder assembly for positioning in accordance with the direction said supply feed unit projects from the control unit, said accumulating chamber being shiftable within the transfer unit for alignment with the transverse transfer plate, and said vertical transfer mechanism being adjustably mounted on the transfer unit for alignment with the accumulating chamber.

5. In a casing machine as claimed in claim 4, said vacuum lines to other units being mounted on said control unit for movement to two positions to lie along opposite sides of the control unit for attachment to opposite sides of the transfer unit in accordance with the position of the accumulating chamber.

6. In a casing machine as claimed in claim 1, a control table on said control unit, transverse transfer mechanism mounted on the table having its longitudinal axis in a vertical plane which includes the centerline of the table, an accumulator floor retracting cylinder assembly mounted beneath the table and having its longitudinal axis in the plant of the table centerline, a manifold beneath the table extending across the table centerline, means connecting said manifold to the vacuum source, said manifold having outlet openings therealong arranged symmetrically on opposite sides of said centerline, said table having conduit openings directly above the openings in the manifold, whereby said controls may be mounted in different arrangements on the table and be coupled to the manifold, said vacuum lines including preformed pipe sections for connection to said controls and said transverse transfer mechanism and accumulator floor retracting cylinder assembly.

7. In a casing machine as claimed in claim 6, said vacuum lines also including preformed pipe sections connectible to said vacuum supply in reverse positions to lie along one side or the other of the control table.

8. In a casing machine as claimed in claim 1, said accumulating chamber having side and back walls, a pair of guide rails carried by the transfer frame, said side walls being mounted on said guide rails for independent movement therealong, a second pair of guide rails on said transfer unit with said back wall being mounted thereon for movement therealong.

9. In a casing machine as claimed in claim 8, guide rails mounted above the accumulating chamber, said vertical transfer mechanism including a carriage slidably mounted on the rails above the accumulating chamber and a cylinder assembly on said carriage, said guide rails above the accumulating chamber being mounted for sliding movement at right angles to the length of the rails, whereby the vertical transfer cylinder assembly may be adjusted laterally in all directions.

10. In a casing machine having means to transfer laterally articles fed into the machine which means includes a fluid operated piston and cylinder assembly with a transfer plate connected to the piston, the improvement which includes a guide rod for said transfer plate, a bearing for said guide rod, and a connection between said transfer plate and guide rod which permits some movement of the plate relative to the guide rod.

No references cited.